April 24, 1934.   R. D. EVANS   1,956,011
MEANS FOR DIMINISHING TRACTION AND RIDING NOISE IN TIRES
Filed Feb. 18, 1932   9 Sheets-Sheet 1

Inventor
Rhys D. Evans

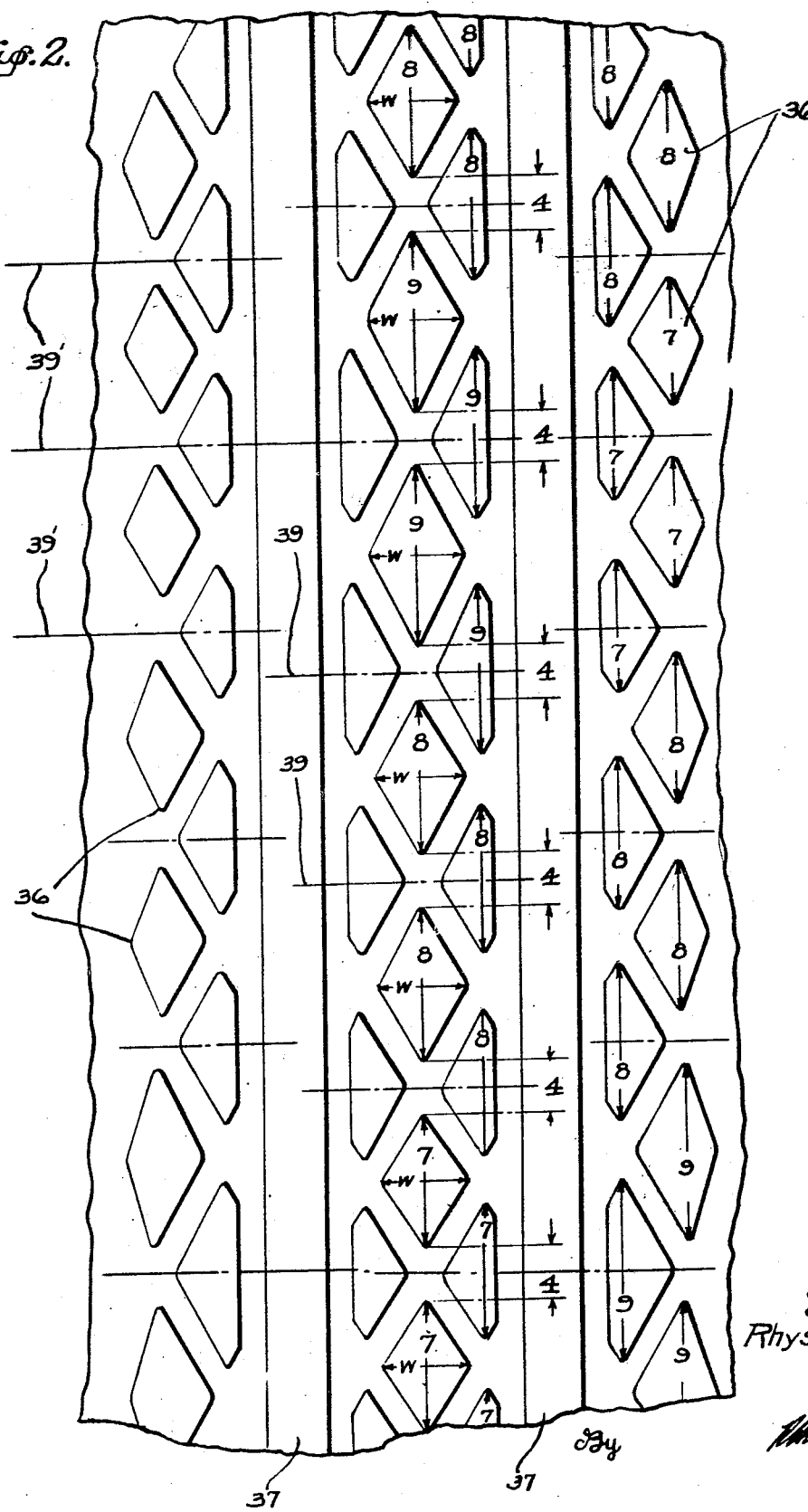

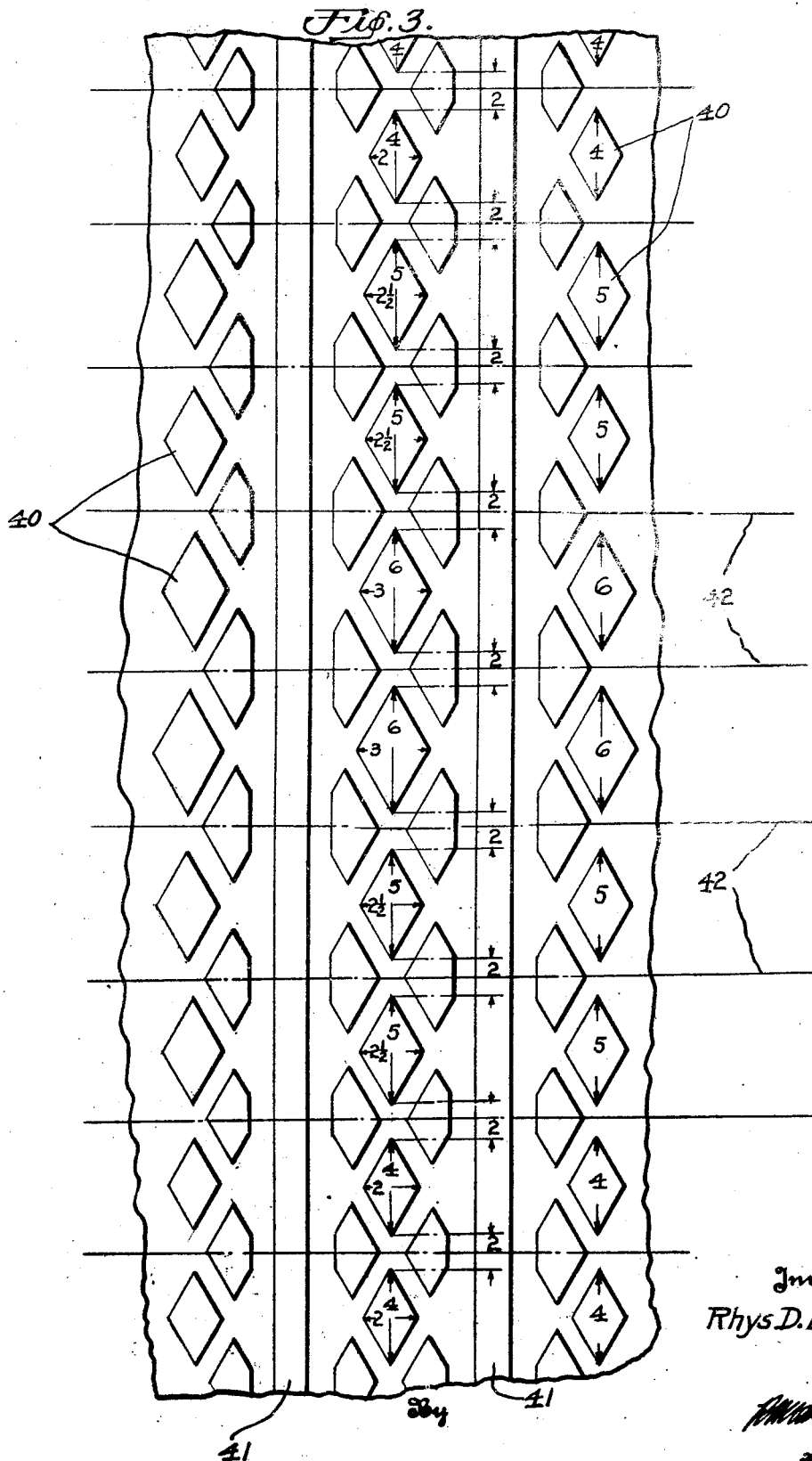

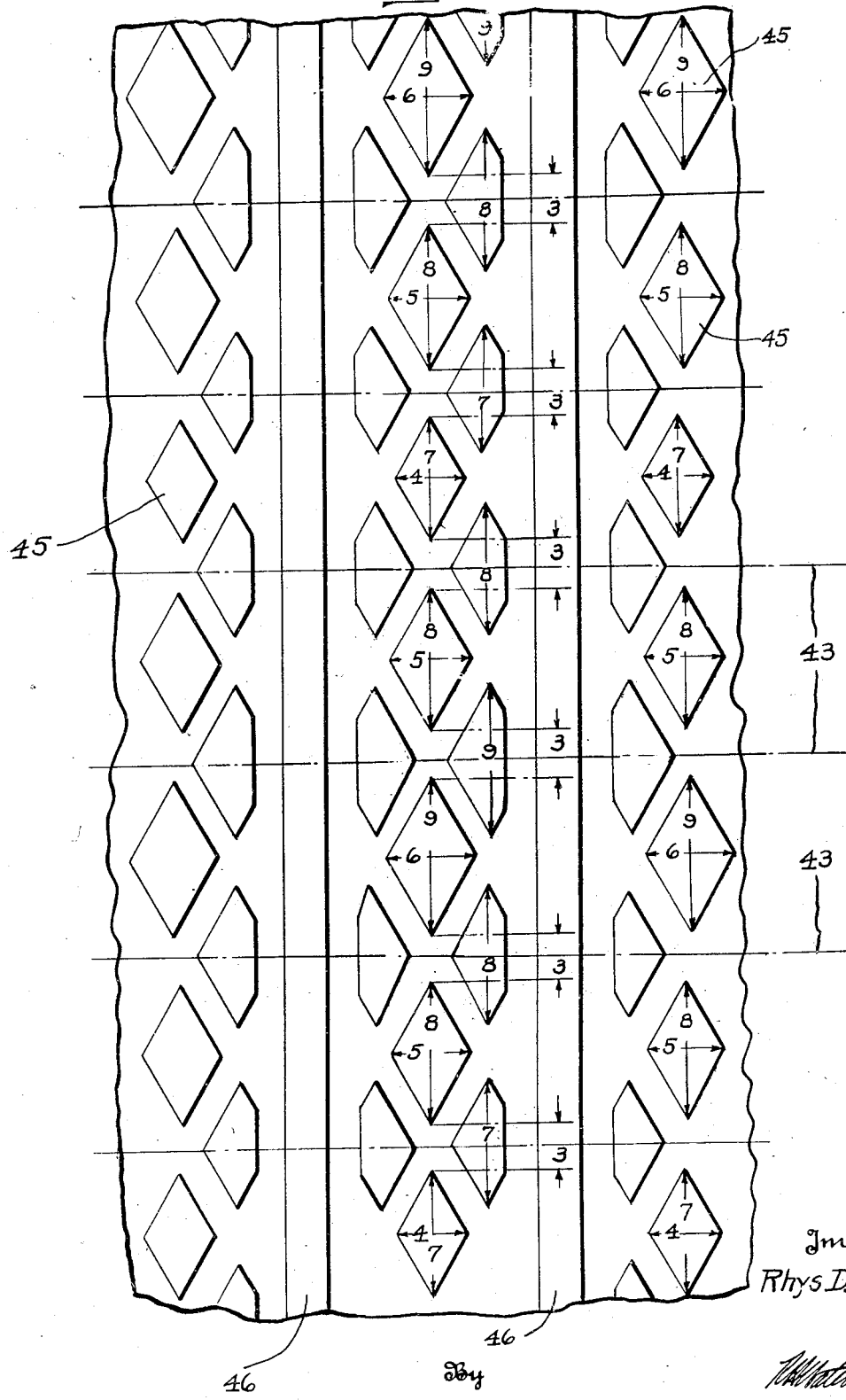

April 24, 1934.   R. D. EVANS   1,956,011
MEANS FOR DIMINISHING TRACTION AND RIDING NOISE IN TIRES
Filed Feb. 18, 1932   9 Sheets-Sheet 5
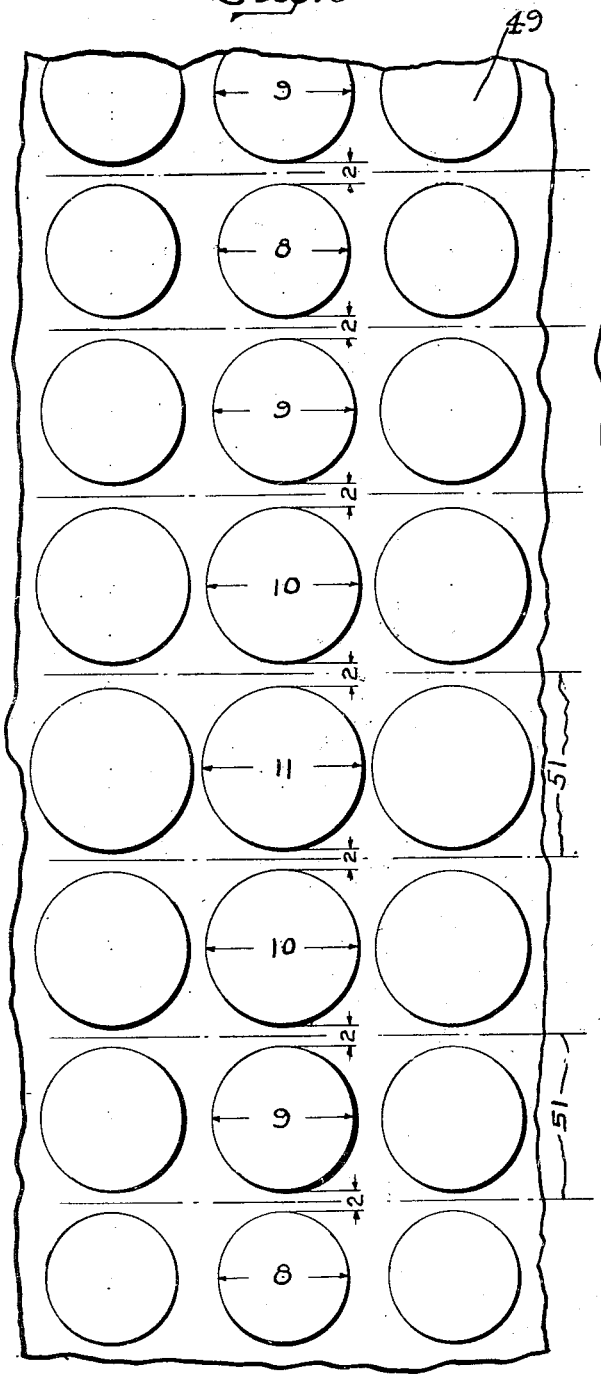
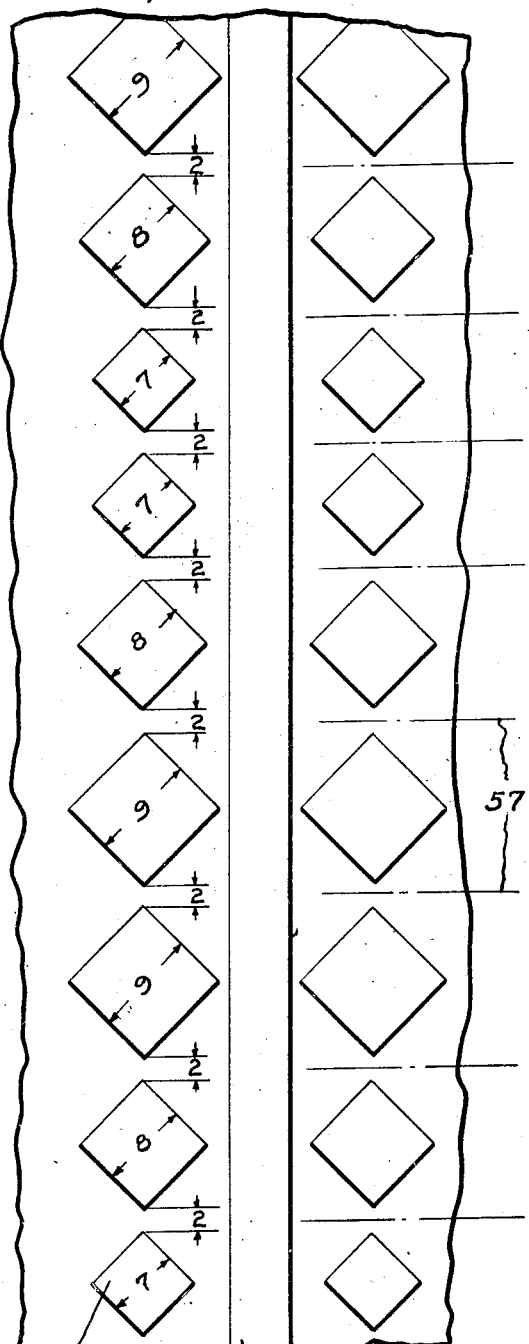

April 24, 1934. R. D. EVANS 1,956,011
MEANS FOR DIMINISHING TRACTION AND RIDING NOISE IN TIRES
Filed Feb. 18, 1932  9 Sheets-Sheet 6
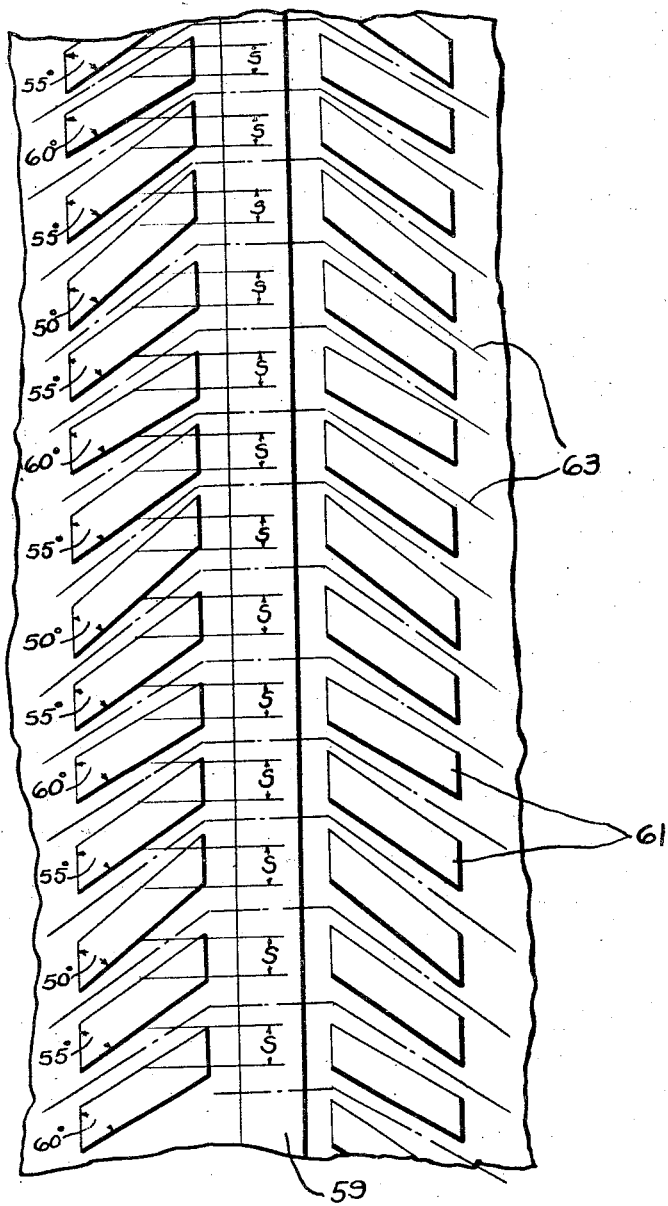

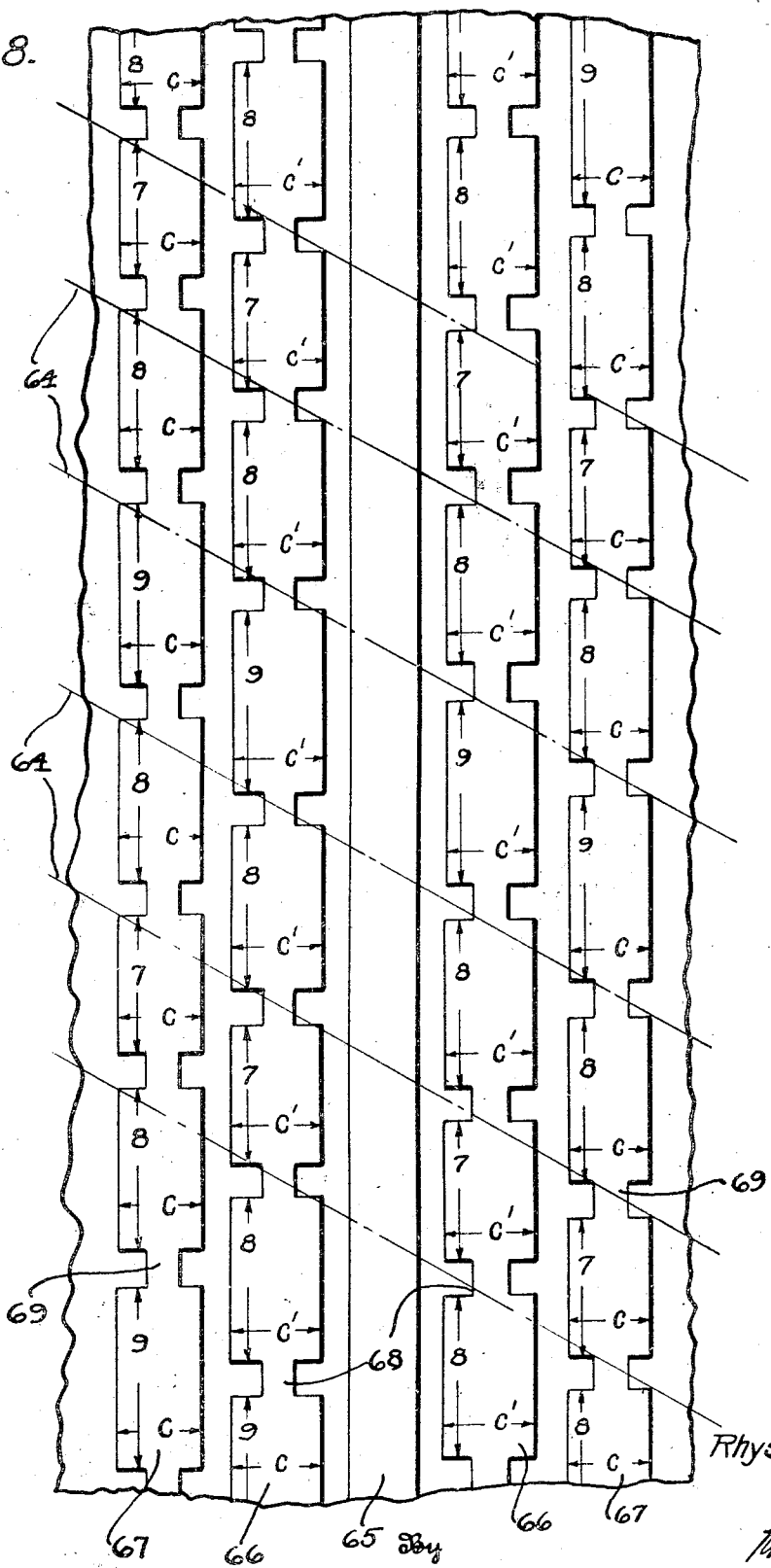

April 24, 1934.   R. D. EVANS   1,956,011
MEANS FOR DIMINISHING TRACTION AND RIDING NOISE IN TIRES
Filed Feb. 18, 1932   9 Sheets-Sheet 8
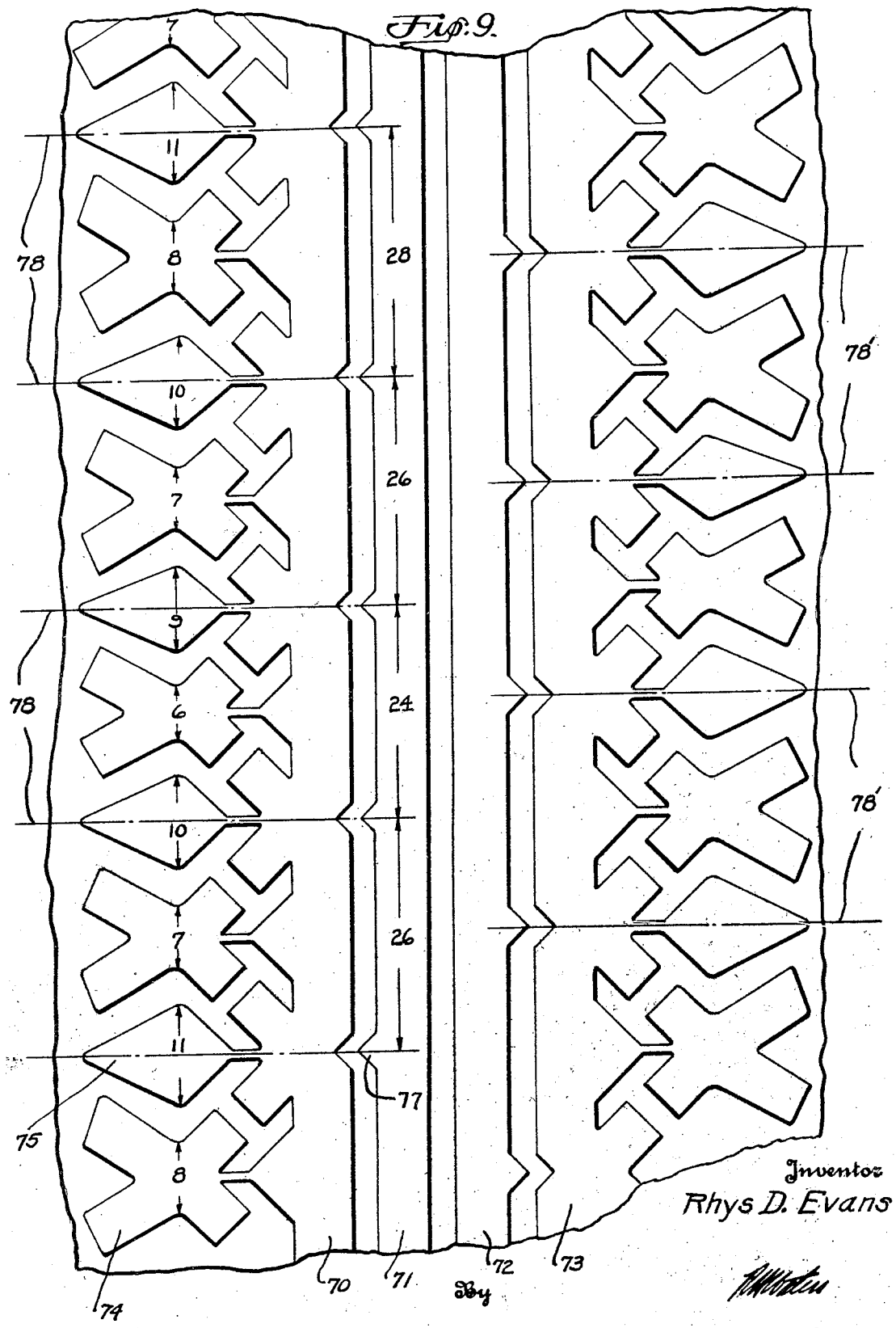

Patented Apr. 24, 1934

1,956,011

UNITED STATES PATENT OFFICE 1,956,011

MEANS FOR DIMINISHING TRACTION AND RIDING NOISE IN TIRES

Rhys D. Evans, Akron, Ohio, assignor to Wingfoot Corporation, Wilmington, Del., a corporation of Delaware Application February 18, 1932, Serial No. 593,861

6 Claims. (Cl. 152—14)

My invention relates to tires and more particularly to the design of tire treads and to the diminution of traction and/or riding noise created by the tire during use. It relates both to a method of and means for accomplishing such diminution, as, for example, by preventing the production of, neutralizing, or otherwise interfering with the sound-developing vibrations and the resonances thereof which are responsible.

It has long been known, for example, that rubber tires provided with non-skid and certain other tread designs under operating conditions tend to develop a noise in the nature of a hum or whine which at times becomes very disagreeable. This noise is more pronounced with certain types of non-skid or traction devices than with others and appears to be somewhat influenced by the nature of the surface over which the tire is passing.

I have discovered that the objectionable noise produced by tires having tread configurations on the surfaces thereof is partially caused by the rhythmic beat of such tread configurations against the contacting surface. These sound-producing vibrations created by the tread configurations may be classified broadly as of two kinds: first, the sound produced by the actual impacting and squashing of the tread configurations as they strike the contacting surface; second, the vibration created in the tire carcass which transmits itself up through the wheel, axle, springs and car body to the passengers in the car in the form of a disagreeable, vibrating hum or whine. The latter of the two noises is by far the most offensive. It has been found that the sound-producing vibrations of a tire are influenced by the size, shape and position of the tread configurations.

In accordance with the principles of my invention the sound-producing vibrations are materially reduced by designing the individual tread configurations so that the vibrations produced thereby differ from each other. By avoiding uniformity or regularity of the tread configuration, it is possible to produce a tire which is comparatively quiet when in rolling contact with another surface. Uniformity or regularity of the tread elements or configurations can be avoided in many different ways, as by modifying or changing the size, shape, or position of the individual configurations as hereafter described more in detail. The basic principle, however, involves a non-uniformity in the tread configurations as distinguished from former known types of treads in which the configurations or tread units are uniform in a circumferential plane of the tire.

It is an object of my invention to diminish the whine or hum produced by tires when rotating in contact with another member or surface.

Another object of the invention is to provide a rubber tire with a non-skid tread which is substantially quieter than any heretofore known.

Another object is to provide a tire in which the vibrations and the resonances thereof produced upon the tire carcass by the tread configurations are materially reduced to give a tire quiet in operation.

Another object is to provide a tire in which the periodicity of the vibration producing configurations is varied to such an extent that a quiet tire is produced.

Another object of the invention is to provide a method of breaking up sound-producing vibration which can be practiced with respect to substantially any type of tire tread.

The foregoing and other objects of the invention, some of which will be apparent as the description of the invention proceeds, are achieved by method and means described below and illustrated in the accompanying drawings, in which Fig. 1 is an enlarged plan of one form of tire tread embodying the invention;

Fig. 2 is a plan similar to Fig. 1 of a slightly modified form of tread;

Fig. 3 is a plan similar to Figs. 1 and 2 showing another modification;

Fig. 4 is a plan similar to Figs. 1, 2 and 3 of a further modification;

Fig. 5 is a plan showing the invention as applied to a tread in which the elements are circular;

Fig. 6 is a plan of another type of tread embodying my invention;

Fig. 7 is a plan of another tread illustrating the invention;

Fig. 8 is a plan of another tread made up in accordance with the principles of the invention;

Fig. 9 is a plan view of another tread falling within the scope of the invention.

In practicing the invention the tire has on its periphery a plurality of tread buttons or elements 36 forming a non-skid or traction surface. The same is designed in accordance with the principles of the present invention to provide a tread which is substantially quieter than those heretofore known.

Figure 1:
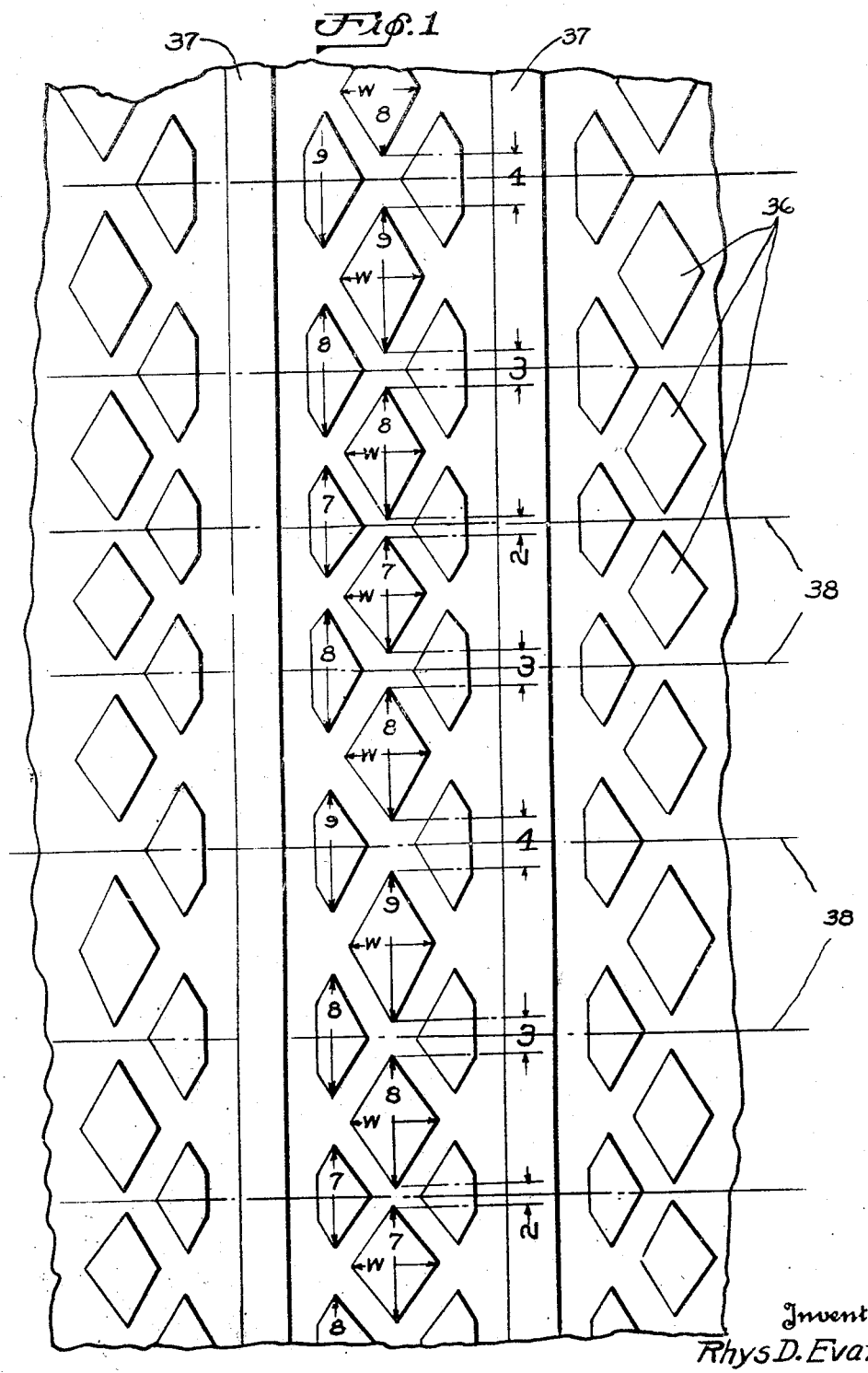

Fig. 1 illustrates an enlarged plan of the tread buttons or elements 36 incorporated in the tread of the tire 35, which tread is of the type combining circumferential ribs and diamond shaped elements. As clearly indicated in Fig. 1, the buttons or elements 36 are formed of periodically varying size, as indicated by the dimensions 7—8—9—8—7, etc. The button marked with the dimension 9 measures 9 upon a selected scale, whereas the buttons marked 7 and 8 scale 7 and 8, respectively. It will be seen that the tread buttons 36, instead of being of the same length throughout, vary in length periodically in the following order: 7—8—9—8—7—8—9—8—7, etc. In addition, the distance between the tread buttons 36 also varies. The distance between the buttons scaling 7 and 8 measures 2, the distance between the buttons scaling 8 and 9 measures 3, the distance between the buttons scaling 9 and 8 measures 4 and the distance between the buttons scaling 8 and 7 measures 3. In other words, the distance between the buttons varies as follows: 2—3—4—3—2—3—4—3—2 etc.

It will thus be seen that the tire buttons 36 entering into the tread shown in Fig. 1 are non-uniform in size and spacing. The noise producing vibration thereof when the tire is rolling upon a road is correspondingly reduced, not only because the distance between the buttons changes periodically but also because the size of the buttons is varied. In the particular form of tread shown, the width of the tread buttons 36 indicated by the letter W remains constant, although it may, of course, be varied if desired.

It will also be seen that the buttons 36 outside the circumferential ribs 37 of the tire are spaced in exactly the same manner as the buttons 36 between the ribs. The buttons scaling 9 between the ribs 37 are opposite the buttons scaling 9 outside the ribs. Dot and dash lines 38 indicate how the tread design is divided into units.

Fig. 2 shows another manner in which the tread can be made. In this application of the principles of the invention, the distance between the tread buttons 36 remains constant, as illustrated by the dimensions given on the drawings. This distance is indicated as measuring 4 on a selected scale. The buttons 36 placed upon the outside of the circumferential ribs 37 are not placed so that the buttons scaling 7, 8 and 9 are in transverse alinement with the buttons scaling 7, 8 and 9 between the ribs of the tire. Instead, the buttons scaling 7 on the outside of the ribs are approximately opposite the buttons scaling 9 between the ribs. This brings the buttons scaling 8 between the ribs in substantial alinement with the 8 buttons outside the ribs. However, the buttons scaling 9 outside the ribs will then be in approximate alinement with the buttons scaling 7 between the ribs.

By this relative arrangement of the buttons between the circumferential ribs 37 and those outside of the ribs, the periodic vibration of the tire is broken up so that a substantially quieter tire tread is produced. It will be seen, moreover, that in this modification the tread buttons, instead of being placed in a 7—8—9—8—7 series, as are the buttons in Fig. 1, are placed throughout in double arrangement as follows: 7—7—8—8—9—9—8—8—7—7—8—8 etc. This spreads the series over a greater distance along the periphery of the tire and reduces the rhythmical sound-producing characteristics of the tread. Unit lines between and outside the ribs 37 are indicated by the numerals 39 and 39', respectively.

The form of the invention illustrated in Fig. 3 illustrates a further application of the teachings of the invention to the tread first illustrated. In the application, the tread buttons indicated by the numerals 40 scale 4, 5 and 6. These buttons are placed in double order so that the occurrence thereof on the tread can be designated as follows: 4—4—5—5—6—6—5—5—4—4—5—5 etc. It will be seen from a study of the figure and from the dimensions given thereon that the width of the buttons changes in proportion to the length. The buttons scaling 4 in length scales 2 in width; that measuring 5 in length measures 2½ in width. In the same way, the button scaling 6 in length scales 3 in width. The distance between the buttons is constant, being indicated as 2. The buttons 40 upon the outside of the circumferentially extending ribs 41 are placed laterally opposite similar buttons 40 lying between the ribs 41. The numeral 42 indicates lines dividing the design into units.

Another modification of the tread illustrated in Figs. 1, 2 and 3 is shown in Fig. 4. The buttons 45 scale 7, 8 and 9, respectively, and are placed in the following relation: 7—8—9—8—7—8—9 etc. The widths of the several buttons are, respectively, 4, 5 and 6 for the buttons scaling 7, 8 and 9 in length. The distance between the buttons remains constant at 3. Similarly sized buttons are placed opposite of each other upon the shoulders of the tire and between the circumferential ribs 46. Dot and dash lines 42 serve to separate the design into units.

The principles of the present invention as partially exemplified by Figs. 1 to 4 are readily adaptable to any fundamental tread design such as those illustrated and described herein and to the various treads which it is possible to devise therefrom as outlined above. For example, Fig. 5 illustrates a tire tread having circular buttons indicated by the numeral 49, which buttons scale 8, 9, 10 and 11 in diameter. The buttons are placed so that the diameter of the buttons taken on a circumferential line of the tire gives the following ratio: 8—9—10—11—10—9—8—9—10—11 etc. The distance between the buttons 49 could either vary periodically or remain constant as indicated by the distance 2 shown in Fig. 5. Lines 51 divide the design into units as explained elsewhere herein.

Fig. 6 illustrates a tire tread formed of a circumferential rib 54 and square buttons 56, which tread, by the application of the principles of the present invention, is rendered substantially quieter. This is accomplished by varying the squares periodically in dimensions, the squares measuring 7, 8 and 9 upon a side. The squares are positioned with respect to each other so that the following ratio of dimensions is set up upon a circumferential line: 7—8—9—9—8—7—7—8—9 etc. The distance between the respective buttons has been indicated as a constant distance 2. However, this could vary periodically in the manner illustrated in Fig. 1. The tread design is divided into units by lines 57.

It is possible to modify certain tread designs to produce a quiet tread in accordance with the principles of the invention in other ways than those described heretofore. In this connection, Fig. 7 illustrates a tread having a circumferential rib 59 and angularly extending bars 61 upon the sides thereof. In this type of tread, the angle between the bars 61 and the circumferential rib 59 may change periodically. As indicated on the drawings, the bars or elements 61 form angles of 50, 55 and 60 degrees with the circumferential rib 59, which angles vary in the following manner: 60—55—50—55—60—55—50 etc. The distance between the ribs 61 may be constant as indicated by the dimension S or may be varied periodically. In a tread of the type illustrated in Fig. 7 it is possible to combine a periodic change in the size of the elements 61 with a change in the angle thereof. Dot and dash lines 63 divide the tread into units as shown on the drawings.

Fig. 8 illustrates a tire tread comprising a circumferential rib 65 bounded by two rows of blocks 66 and 67 which may, if desired, be connected by fillets or ribs 68 and 69. Lines 64 indicate how the design is separated into units. This tread is readily rendered quiet in accordance with the principle of the present invention by forming the blocks 66 and 67 of periodically varying lengths. The length of the blocks may vary from 9 to 7 in the following ratio: 9—8—7—8—9—8—7 etc. The width of the blocks 66 and 67 may if desired remain constant, being indicated as the distance C' and C respectively. The relative circumferential position of the four rows of blocks with respect to each other can be varied as desired. Various other ways in which this tread design can be modified to render it quiet will readily suggest themselves to the skilled designer in view of the examples given above of the various ways in which the present invention can be practiced.

Fig. 9 illustrates a tread having a plurality of circumferentially extending ribs 70, 71, 72 and 73, the outer ribs 70 and 73 merging into a design unit of the type shown in Fig. 3 and comprising crosses 74 and squares or diamonds 75. Dot and dash lines 78 and 78' indicate how the design is divided into units. This type of tread is readily adaptable to modification in accordance with the principles of the present invention. The crosses 74 can be made to measure 6, 7 and 8 in length with the squares or diamonds 75 scaling 9, 10 and 11. Thus the tread elements on a circumferential line of the tire may be of the following length: 8—11—7—10—6—9—7—10—8—11 etc. The half buttons merging into the circumferential ribs 70 and 73 may be periodically varied in size in a similar manner. The circumferential ribs 70, 71, 72 and 73 may be formed with laterally aligned indentations 76 and cooperating lateral extensions 77. It will be seen that the distances scaling 24, 26 and 28 between the indentations 76 and 77 also vary in a manner similar to the variation in size of the tread buttons 74 and 75 so that the noise produced by the ribs is also reduced. It is also possible to vary the distance between the various buttons to decrease the noise-producing vibration incurred thereby.

Figure 10:
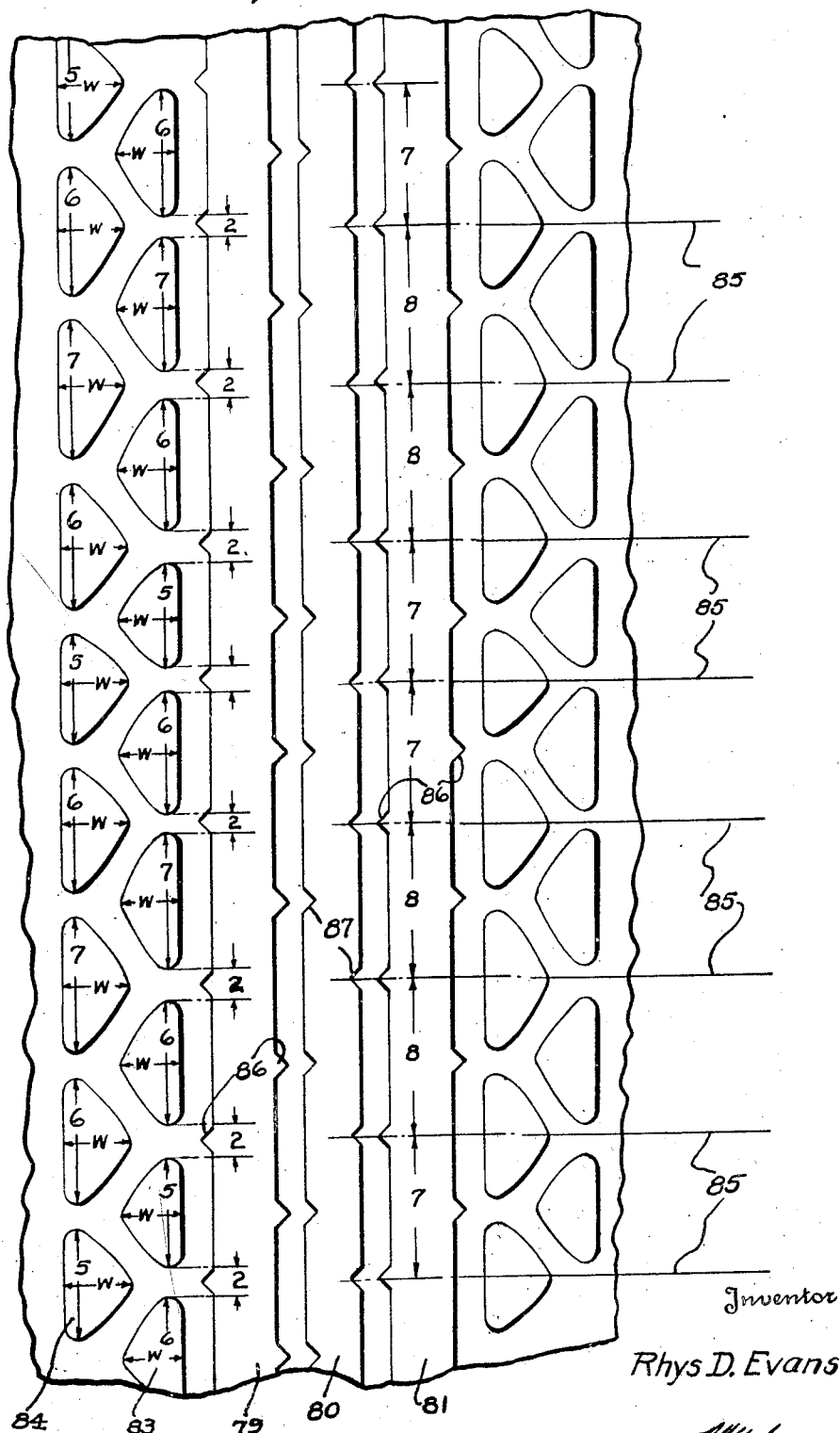
Fig. 10 is a plan of still another tread incorporating its principles.

The tread illustrated in Fig. 10 comprises three circumferentially extending ribs 79, 80 and 81 which are bounded laterally by oppositely turned buttons 83 and 84. The tread is divided into units by lines 85. A tread of this type may be rendered quiet in accordance with the principles of the present invention by making the length of the buttons 83 and 84 of varying dimensions. Thus the buttons are made to scale 5, 6 and 7 and are positioned so that the dimensions vary in the following ratio upon a circumferential line of the tire: 5—6—7—6—5—6—7—6—5 etc. The spacing between the buttons may be kept a constant distance 2 as illustrated, or may itself be varied either with or without change in size of the buttons. The width of the buttons has been illustrated as a constant W but this may also be varied to produce non-uniformity.

The ribs 79, 80 and 81 may be formed with complementary projections 86 and notches 87 which in accordance with the teachings of the present invention may be irregular distances apart. For example, the distances scale 7—7—8—8—7—7—8—8 etc.

It will be evident from the foregoing that substantially any type of tread can be readily modified in accordance with the teachings of my invention so that the tire as a whole is rendered quieter in operation.

It is also entirely possible for the features illustrated in Fig. 7 and disclosed in connection therewith to be incorporated in certain treads. The invention contemplates, among other things, employing the same size buttons and merely changing the dimensions between the buttons periodically to interrupt the period of vibration to render the tire more quiet. One type of unit can be used on one place or area in the tread while another can be used upon another portion of the tread generally spaced laterally therefrom.

Although various modifications of the principle of the present invention will readily suggest themselves to the skilled tire tread designer, my invention broadly contemplates combining one or more of the ideas disclosed to interrupt or change the uniformity of the surface, and thus the period or frequency of sound-producing vibrations or resonances thereof thereby producing a quieter tire.

It is intended that the patent shall cover, by suitable expression in the appended claims, whatever features of patentable novelty reside in the invention.

What I claim is:

1. A tire having a traction tread composed of a plurality of separate traction buttons arranged in similar successive groups around the circumference of the tire, the successive buttons of each group being of different lengths whereby to break up the periodicity of sound-producing vibrations.

2. A tire having a traction tread composed of a plurality of separate traction buttons arranged in similar successive groups around the circumference of the tire, the successive buttons of each group being of different lengths and of different relative spacing whereby to break up the periodicity of sound-producing vibrations.

3. A tire having a traction tread composed of a plurality of similarly-shaped traction buttons arranged circumferentially in similar successive groups, the successive buttons of each group being of different lengths whereby to break up the periodicity of sound-producing vibrations.

4. A tire having a traction tread composed of a plurality of spaced traction elements arranged circumferentially in similar successive groups, some of the elements of each group having different lengths measured in a circumferential direction and the elements being so arranged relative to each other within each group that the aperiodic impulses caused by the elements of different length will interfere with any periodic vibrations of equal frequency resulting from ground engagement during rotation of the tire.

5. A tire having a tread as in claim 4 wherein the spacing of elements in each group is so arranged that there are elements unequally spaced from adjacent elements.

6. A tire having a traction tread composed of a plurality of spaced traction elements arranged circumferentially in similar successive groups, the elements of each group being arranged in pairs, those of each pair being of the same length but of different length from those of adjacent pairs whereby to break up the periodicity of sound-producing vibrations resulting from ground engagement during rotation of the tire.

RHYS D. EVANS.